US008953843B1

(12) United States Patent
Kwan et al.

(10) Patent No.: US 8,953,843 B1
(45) Date of Patent: *Feb. 10, 2015

(54) SELECTING OBJECTS IN A SEQUENCE OF IMAGES

(71) Applicant: Google Inc., Mountain View, CA (US)

(72) Inventors: Gavan Kwan, Mountain View, CA (US); Rushabh Ashok Doshi, Menlo Park, CA (US); Federico Javier Lebrón, Buenos Aires (AR)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,855

(22) Filed: Feb. 5, 2013

Related U.S. Application Data

(63) Continuation-in-part of application No. 13/551,469, filed on Jul. 17, 2012.

(51) Int. Cl.
G06K 9/00 (2006.01)
G06K 9/62 (2006.01)

(52) U.S. Cl.
CPC .................................... G06K 9/62 (2013.01)
USPC .......................................................... 382/103

(58) Field of Classification Search
None
See application file for complete search history.

(56) References Cited

U.S. PATENT DOCUMENTS

| 6,301,370 | B1 | 10/2001 | Steffens et al. | |
| 6,724,915 | B1 | 4/2004 | Toklu et al. | |
| 2003/0108240 | A1 | 6/2003 | Gutta et al. | |
| 2009/0031381 | A1 | 1/2009 | Cohen et al. | |
| 2009/0041310 | A1* | 2/2009 | Yang et al. | 382/118 |
| 2009/0148058 | A1* | 6/2009 | Dane et al. | 382/251 |
| 2009/0185745 | A1* | 7/2009 | Momosaki | 382/190 |
| 2009/0262987 | A1 | 10/2009 | Ioffe et al. | |
| 2010/0054536 | A1 | 3/2010 | Huang et al. | |
| 2010/0296705 | A1 | 11/2010 | Miksa et al. | |
| 2011/0142289 | A1* | 6/2011 | Barenbrug et al. | 382/107 |

OTHER PUBLICATIONS

Benfold, B. and Reid, I., Stable Multi-Target Tracking in Real-Time Surveillance Video, Jun. 20-25, 2011, IEEE Conference on Computer Vision and Pattern Recognition, pp. 3457-3464.*

(Continued)

Primary Examiner — Stephen R Koziol
Assistant Examiner — Jonathan S Lee
(74) Attorney, Agent, or Firm — Lowenstein Sandler LLP

(57) ABSTRACT

The subject matter of this specification can be implemented in, among other things, a computer-implemented method including detecting positions of objects of a specific type within an ordered sequence of images. The method includes estimating one or more intermediate positions of one or more intermediate instances of an object in one or more intermediate images within the ordered sequence of images between an initial image and a subsequent image based on an initial position of an initial instance of the object in the initial image and a subsequent position of a subsequent instance of the object in the subsequent image. The method includes providing a list of the objects for presentation. The method includes receiving a selection of the object from the list. The method includes performing an operation on the initial instance, the intermediate instances, and the subsequent instance of the object.

21 Claims, 4 Drawing Sheets

(56) References Cited

OTHER PUBLICATIONS

Spindler, T., Roth, D., and Steffen, A., Privacy in Video Surveilled Areas, 2006, Proceedings of the 2006 International Conference on Privacy, Security and Trust: Bridge the Gap Between PST Technologies and Business Services, pp. 1-10.*

Agrawal, P. and Narayanan, P.J., Person De-Identification in Videos, Mar. 2011, IEEE Transactions on Circuits and Systems for Video Technology, vol. 21, No. 3, pp. 299-310.*

Kong, J., Ganev, I., Schwan, K., and Widener, P., CameraCast: Flexible Access to Remote Video Sensors, 2007, Multimedia Computing and Networking, vol. 6504, pp. 1-12.*

"Open Source Computer Vision Library," Jun. 22, 2008, captured Jul. 10, 2012 at http://web.archive.org/web/20080622022928/http://www.intel.com/technology/computing/opencv/.

Pittsburgh Pattern Recognition "Face Tracking", May 6, 2010, captured Jul. 10, 2012 at http://web.archive.org/web/20100506081616/http://www.pittpatt.com/face_tracking.

Frome, Andrea, "Street View revisits Manhattan", Google Lat Long Blog May 12, 2008, captured Jul. 9, 2012 at http://web.archive.org/web/20080514090502/http://google-latlong.blogspot.com/2005/05/street-view-revisits-manhattan.html.

Kim, Minyoung, et al., "Face Tracking and Recognition with Visual Constraints in Real-World Videos", IEEE Conference on Computer Vision and Pattern Recognition, pp. 1-8, 2008.

Cucchiara et al. "Computer Vision Techniques for PDA Accessibility of In-House Video Surveillance", 2003, IWVS' 03, pp. 87-97.

Senior et al. "Blinkering Surveillance: Enabling Video Privacy through Computer Vision", IBM Research Report, Aug. 28, 2003, pp. 1-14.

USPTO, Office Action for U.S. Appl. No. 13/551,469, mailed Apr. 28, 2014.

* cited by examiner

SELECTING OBJECTS IN A SEQUENCE OF IMAGES

CROSS-REFERENCE TO RELATED APPLICATIONS

This application is a continuation-in-part of U.S. patent application Ser. No. 13/551,469, filed on Jul. 17, 2012 and entitled "Detecting Objects in a Sequence of Images," the entire contents of which is incorporated herein by reference.

TECHNICAL FIELD

This instant specification relates to selecting one or more objects in a sequence of images.

BACKGROUND

Object detection has been employed to identify the position and size of human faces in digital images. Face detection is a specific type of object detection. Other types of object detection can include, for example, people and vehicles. Face detection algorithms often divide each image into individual features. The features are then classified as being a face or part of a face based on a comparison to a database of facial features. For example, the database of facial features may include data that represents typical images of eyes, noses, and mouths.

Once detected, a computing system can then perform operations on the faces in the images. For example, the computing system can copy a face and place the copied face onto a new background image. In another example, the computing system can blur a face of a person in an image to protect the identity of the person.

SUMMARY

In one aspect, a computer-implemented method includes detecting, by a processing device, positions of objects of a specific type within an ordered sequence of images stored in a memory. The positions of the objects include at least one initial position of at least one initial instance of an object of the specific type in at least one initial image within the ordered sequence of images and at least one subsequent position of at least one subsequent instance of the object in at least one subsequent image within the ordered sequence of images. The method further includes estimating, by the processing device, one or more intermediate positions of one or more intermediate instances of the object in one or more intermediate images within the ordered sequence of images between the initial image and the subsequent image based on the initial position and the subsequent position. The method further includes providing, by the processing device, a list of the objects for presentation. The method further includes receiving, by the processing device, a selection of the object from the list. The method further includes performing, by the processing device, an operation on the initial instance, the intermediate instances, and the subsequent instance of the object without performing the operation on instances of one or more others of the objects that are not selected.

Implementations can include any, all, or none of the following features. Estimating the intermediate positions can include calculating a linear interpolation of the intermediate positions between the initial position and the subsequent position. The operation can include blurring the object at the initial position in the initial image, the intermediate positions in the intermediate images, and the subsequent position in the subsequent image. Blurring the object can include lowering a resolution of the object at the initial position in the initial image, the intermediate positions in the intermediate images, and the subsequent position in the subsequent image. The method can include determining that the intermediate images include a number of images that are within a threshold number of images and, in response, estimating the intermediate positions. The threshold number of images can be based on a threshold amount of time. The ordered sequence of images can be a video. The method can further include buffering the video for at least the threshold amount of time. The method can further include providing the video for presentation with the object blurred. Blurring the object can include blurring the object in real-time with a delay due to buffering the video for at least the threshold amount of time. The method can include estimating one or more additional positions of the object in one or more additional images within the ordered sequence of images. The additional images can be at one or more of before the initial image or after the subsequent image. The additional positions of the object in any ones of the additional images before the initial image can be based at least on the initial position and the additional positions of the object in any ones of the additional images after the subsequent image can be based at least on the subsequent position. Any ones of the additional images before the initial image and any ones of the additional images after the subsequent image can include up to a threshold number of images. The threshold number of images can be based on a threshold amount of time.

In one aspect, a computer-implemented system includes one or more interfaces that receive an ordered sequence of images. The system further includes a data storage that stores the received ordered sequence of images. The system further includes an object detection module that detects positions of instances of objects of a specific type within the ordered sequence of images. The system further includes an object clustering module that clusters at least a first set of the instances for a first one of the objects. The first set includes at least one initial instance at an initial position within at least one initial image from the ordered sequence of images and at least one subsequent instance at a subsequent position within at least one subsequent image after the initial image in the ordered sequence of images. The system further includes an object estimation module that estimates one or more intermediate positions of one or more intermediate instances of the first one of the objects within one or more intermediate images between the initial image and the subsequent image in the ordered sequence of images based on the initial position and the subsequent position. The system further includes a face blurring module that provides a list of the objects for presentation, receives a selection of the first one of the objects from the list, and blurs the initial instance, the intermediate instances, and the subsequent instance of the first one of the objects without blurring instances of one or more others of the objects that are not selected.

Implementations can include any, all, or none of the following features. The object estimation module can estimate the intermediate positions by calculating a linear interpolation of the intermediate positions between the initial position and the subsequent position. The object blurring module can blur the first one of the objects by lowering a resolution of the first one of the objects at the initial position in the initial image, the intermediate positions in the intermediate images, and the subsequent position in the subsequent image. The object estimation module can determine that the intermediate images include a number of images that are within a threshold number of images and, in response, estimate the intermediate positions. The threshold number of images can be based on a threshold amount of time. The ordered sequence of images can be a video. The interfaces can buffer the video for at least the threshold amount of time, and provide the video for presentation with the first one of the objects blurred. The object blurring module can blur the first one of the objects by blurring the object in real-time with a delay due to buffering the video for at least the threshold amount of time. The object estimation module can estimate one or more additional positions of the first one of the objects in one or more additional images within the ordered sequence of images. The additional images can be at one or more of before the initial image and after the subsequent image. The additional positions of the first one of the objects in ones of the additional images before the initial image can be based at least on the initial position and the additional positions of the first one of the objects in ones of the additional images after the subsequent image can be based at least on the subsequent position. The ones of the additional images before the initial image and the ones of the additional images after the subsequent image can include up to a threshold number of images. The threshold number of images can be based on a threshold amount of time.

In one aspect, a non-transitory computer readable storage medium having stored therein instructions which, when executed by a processing device, cause the processing device to perform a method including detecting, by the processing device, positions of objects of a specific type within an ordered sequence of images stored in a memory. The positions of the objects include at least one initial position of at least one initial instance of an object of the specific type in at least one initial image within the ordered sequence of images and at least one subsequent position of at least one subsequent instance of the object in at least one subsequent image within the ordered sequence of images. The method further includes estimating, by the processing device, one or more intermediate positions of one or more intermediate instances of the object in one or more intermediate images within the ordered sequence of images between the initial image and the subsequent image based on the initial position and the subsequent position. The method further includes providing, by the processing device, a list of the objects for presentation. The method further includes receiving, by the processing device, a selection of the object from the list. The method further includes performing, by the processing device, an operation on the initial instance, the intermediate instances, and the subsequent instance of the object without performing the operation on instances of one or more others of the objects that are not selected.

Implementations can include any, all, or none of the following features. The operation can include blurring the object at the initial position in the initial image, the intermediate positions in the intermediate images, and the subsequent position in the subsequent image.

The details of one or more implementations are set forth in the accompanying drawings and the description below. Other features and advantages will be apparent from the description and drawings, and from the claims.

DETAILED DESCRIPTION

This document describes systems and techniques for selecting one or more objects in an ordered sequence of images, such as video. Instances of multiple objects of a particular type, such as faces of persons, are detected in the ordered sequence of images based on a comparison of features in the images to previously identified features for the type of object, such as previously identified facial features. One or more other instances of the objects in the ordered sequence of images are then estimated based on the detected instances of the objects. In some implementations, a location and/or size of the object within an image can be estimated even though the object may be obscured and/or in a different orientation than an orientation of the object in the detected instances. A selection of a first one of the objects is made. Operations can then be performed on the detected and estimated instances of the first one of the objects, such as an operation to blur instances of a face object or a license plate object to protect an identity and/or personal information of a person. Other ones of the objects may be left as is, e.g., without being blurred.

Figure 1:
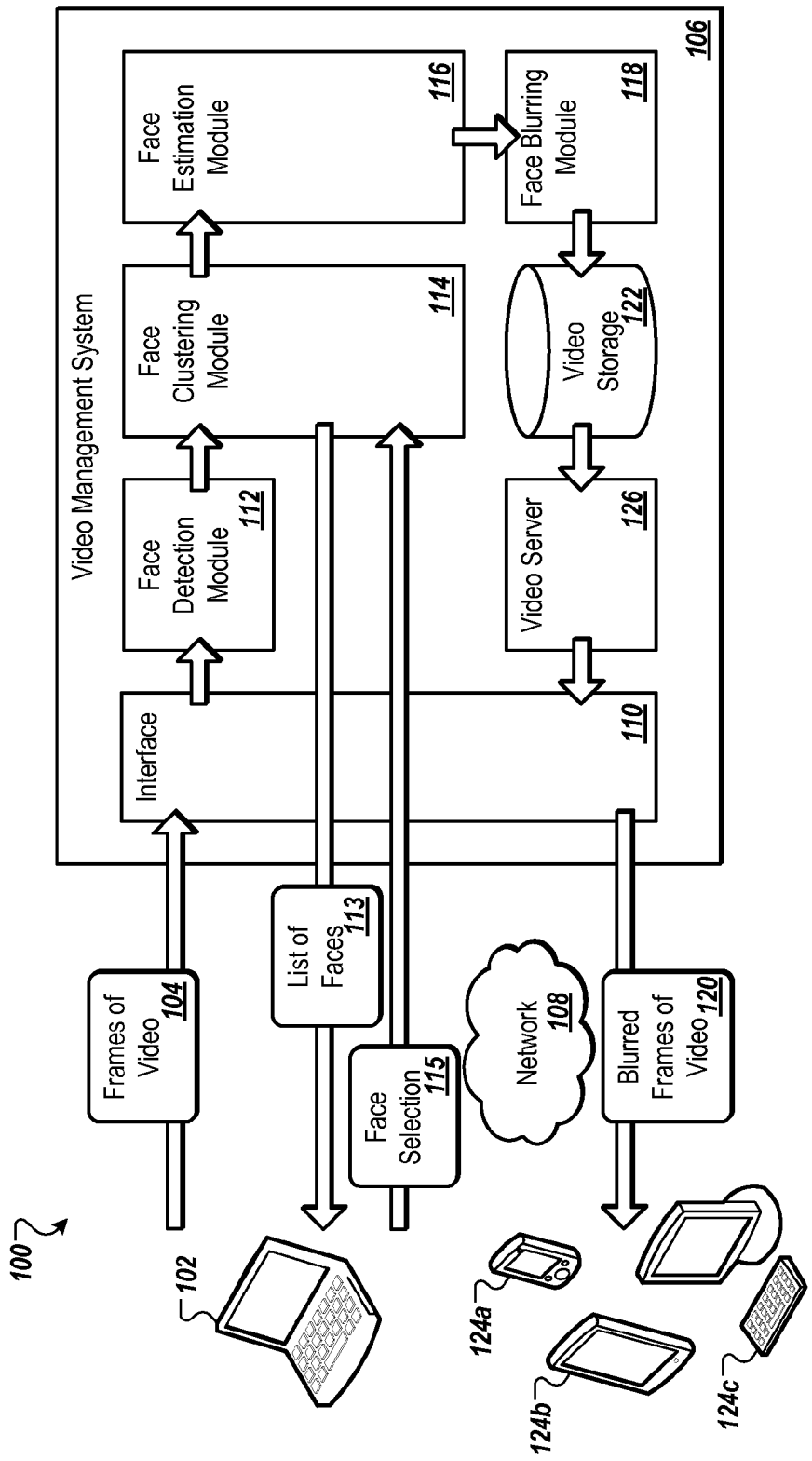
FIG. 1 is a schematic diagram that shows an example of a system for selecting one or more objects, such as faces, in an ordered sequence of images, such as video.

FIG. 1 is a schematic diagram that shows an example of a system 100 for selecting one or more objects, such as faces, in an ordered sequence of images, such as video. The system 100 detects positions and/or sizes of instances of faces in the video using face detection. The video also includes other instances of faces that may not be detected by the face detection, such as instances where a face is obscured by another object and/or where a face is in a profile view. The system 100 can use the detected positions and/or sizes of the instances of faces to estimate positions and/or sizes of the other instances of faces. The system 100 can then perform operations on one or more selected ones of the detected and estimated instances of the faces.

The system 100 includes a computing device 102 that sends multiple frames of video 104 to a video management system 106 over a network 108. The computing device 102 can include, for example, a mobile device such as laptop or smart phone, or a desktop computing device. The network 108 can include, for example, a local network and/or one or more of the computing devices that make up the Internet. The video management system 106 can be implemented using one or more computing devices. Each of the components within the video management system 106 can be implemented in combination with one or more of the other components, for example, at a same computing device or at separate computing devices.

The video management system 106 receives the frames of video 104 through an interface 110. The interface 110 provides communication between the video management system 106 and computing devices on the network 108. The interface 110 can include hardware, such as a wired and/or wireless connection to the network 108. The interface 110 can also provide a user interface to the computing device 102, such as a web page for uploading the frames of video 104 to the video management system 106. The interface 110 can also provide a user interface to the computing device 102 for making requests to edit the frames of videos 104, such as a request from a user at the computing device 102 to detect faces within the frames of video 104 and/or a request to blur a particular face within the frames of video 104.

In response to a request to detect faces in the frames of video 104, the interface 110 provides the frames of video 104 to a face detection module 112. Alternatively, the interface 110 can automatically provide the frames of video 104 to the face detection module 112, for example, in response to receiving the frames of video 104. The face detection module 112 applies a face detection algorithm to the frames of video 104. For example, the face detection module 112 can divide each of the frames of video 104 into features, such as by detecting edges between different areas of brightness and/or focal blur. The face detection module 112 can then compare each of the features from the frames of video 104 to a database of facial features. The database can include faces and/or features within faces that represent examples and/or models of faces. The examples and/or models of faces can be manually selected, for example, from images. If the face detection module 112 determines that one or more features from one of the frames of video 104 are similar (e.g., correspond by at least a threshold degree) to one or more facial features in the database, then the face detection module 112 determines that the features from the frame of video include a face.

The face detection module 112 also detects one or more other instances of faces in the frames of video 104 and provides data that describes the detected faces to a face clustering module 114. For example, the face detection module 112 can detect at least one initial instance of a face within at least one initial frame of video and at least one subsequent instance of the face within at least one subsequent frame of video. The subsequent frame is located, chronologically, after the initial frame in the sequence of the frames of video 104. The face clustering module 114 compares the instances of faces across the frames of video 104 to determine which ones of the instances of faces likely represent the same face. Each cluster includes the instances of faces that likely represent the same face.

The face clustering module 114 then provides a list of faces 113 to the computing device 102, e.g., through the interface 110. For example, the interface 110 may provide a user interface, such as a web interface, that includes the list of faces 113. The computing device 102 presents the list of faces 113 to a user, for example, on a display device of the computing device 102. The list of faces 113 may include, for example, a representative instance of each face from each cluster, such as an instance of each face that shows a substantially frontal view of the face.

In some implementations, the user at the computing device 102 may have previously provided names, nicknames, or other identifiers for instances of faces. The video management system 106 may store the identifiers and the associated instances of faces in a data storage. The face clustering module 114 may then compare sets of instances of faces in the clusters to the stored instances. If the face clustering module 114 determines that a set of instances of a face from the clusters matches a stored instance of a face to a threshold degree, then the face clustering module 114 may retrieve the identifier associated with the stored instance of the face and include the identifier in the list of faces 113.

The computing device 102 then receives a selection 115 from the user of one or more of the faces from the list of faces 113. The computing device 102 provides the selection 115 to the video management system 106, e.g., through the interface 110. For example, the interface 110 may provide a user interface, such as a web interface, through which the user at the computing device 102 may make the selection 115.

In addition to the list of faces 113, the computing device 102 may also present a preview of the frames of video 104, for example, using a video player within the web interface. In response to receiving the selection 115, the video management system 106 and/or the client-side portion of the web interface at the computing device 102 may cause the preview of the frames of video 104 to move to a portion of the frames of video 104 where the selected face occurs. Subsequent selections of the same face may result in advancing the frames of video 104 to subsequent instances of the selected face within the frames of video 104.

The web interface may include separate user input controls or buttons for requesting that the preview advance to a particular face and for requesting that a particular face be blurred. The web interface may also include separate user input controls for requesting that the preview advance to particular instances of a face within the frames of video 104, such as links that each show an indication of a range of times within the video over which a sequence of instances of the face occur. The web interface may also include a user input control for requesting that a particular face be unblurred.

The face clustering module 114 then provides data that describes the clusters of faces and the selection 115 to a face estimation module 116. The face estimation module 116 estimates positions and/or sizes of one or more other instances of at least the faces in the selection 115 based on the clusters of instances for the faces. The face estimation module 116 may also estimate positions and/or sizes of instances of faces in the clusters other than the faces in the selection 115.

In some implementations, the face estimation module 116 can perform a linear interpolation between at least one initial instance of a face and at least one subsequent instance of the face to estimate the positions and/or sizes of one or more intermediate instances of the face. The face clustering module 114 determines that the initial and subsequent instances of the face likely represent the same face, and identifies one or more intermediate frames (between the initial frame(s) and subsequent frame(s)) that do not include detected instances of the face. The face estimation module 116 then estimates the positions of each one of the intermediate instances of the face within a corresponding intermediate frame of video between the initial frame of video and the subsequent frame of video.

In an example of linear interpolation with one intermediate instance of the face, the face estimation module 116 can place the position of the intermediate instance in the intermediate frame horizontally and/or vertically halfway between the position of the initial instance in the initial frame and the position of the subsequent instance in the subsequent frame. The face estimation module 116 can also assign a size to the intermediate instance that is halfway between a size of the face in the initial instance and a size of the face in the subsequent instance.

In an example of linear interpolation with multiple intermediate instances of the face, the face estimation module 116 can allocate the distance between the position of the initial instance in the initial frame and the position of the subsequent instance in the subsequent frame evenly among the intermediate instances in corresponding ones of the intermediate frames. The face estimation module 116 can also allocate the change in size between the initial instance and the subsequent instance evenly among the intermediate instances.

In some implementations, the face estimation module 116 can perform a polynomial interpolation and/or spline interpolation (e.g., a piecewise linear and/or polynomial interpolation) between one or more initial instances of the face and one or more subsequent instances of the face to estimate positions and/or sizes of the intermediate instances of the face. The face estimation module 116 uses the initial instances and the subsequent instances to generate a polynomial and/or set of polynomials (in the case of spline interpolation) that defines the position and/or size of the face within each intermediate frame of video as a function of the order of the intermediate frame within the sequence of video. The face estimation module 116 then uses the order of each intermediate frame in the sequence of video to estimate the positions and/or sizes of the corresponding intermediate instances of the face based on the polynomial and/or set of polynomials.

In some implementations, the face estimation module 116 includes up to a threshold number of estimated instances of the face in intermediate frames (e.g., the face estimation module 116 will not perform face estimation if the number of intermediate frames is above a threshold). For example, if the face estimation module 116 determines that the intermediate frames include more than the threshold number of frames, then the face estimation module 116 does not estimate positions and/or sizes of the face for the intermediate frames. The face estimation module 116 can base the threshold number of frames on a threshold amount of time, such as such as a few seconds (e.g., about one, two, or three seconds) of frames between the initial frame and the subsequent frame. The interface 110 can, in some implementations, provide a user interface to the computing device 102 with which a user can input the threshold amount of time or the threshold number of frames to be used for intermediate frames.

In some implementations, if the face estimation module 116 determines that the estimated position of the face in an intermediate frame moves by more than a threshold amount across the frame (e.g., a particular fraction of the height and/or width of the frame) as compared to an instance of the face in a preceding and/or following frame, then the face estimation module 116 refrains from estimating the position for the intermediate frame. For example, the face estimation module 116 can determine that an estimated position moves the face by more than about, e.g., one fifth, one tenth, or one twentieth of either the width or height of the frame between the initial frame and a following intermediate frame, then the face estimation module 116 does not estimate the position of the face for the intermediate frame.

In some implementations, the face estimation module 116 determines that the intermediate frames each include one or more features that partially resemble a face and/or partially resemble a particular face in a cluster. For example, as a result of dividing the frames into features and comparing the features from the frames to existing facial features, the face detection module 112 can assign a score to each set of features from the images. The score indicates how closely the features match the facial features, with a higher score indicating a closer match than a lower score. If the face detection module 112 determines that the score for a set of features in an image is at least a threshold level for detection, then the face detection module 112 identifies the set of features as a face and provides information describing the face to the face clustering module 114. If the score for the set of features is less than the high threshold level for detection but above a lower threshold for partial detection, then the face detection module 112 can identify the frame as a candidate for estimation. Accordingly, the face estimation module 116 estimates the position and/or size of the face in the frame.

In some implementations, the face estimation module 116 can perform an extrapolation on the initial instances and/or the subsequent instances of a face in the frames of video 104 to estimate positions of additional instances of the face before the initial instances and/or after the subsequent instances. The face estimation module 116 can use the position and/or size of a face in a first of the initial frames as the corresponding position and/or size for additional instances of the face in additional frames before the first of the initial frames. In addition, the face estimation module 116 can use the position and/or size of a face in a last of the subsequent frames as the corresponding position and/or size for additional instances of the face in additional frames after the last of the subsequent frames.

In another example of extrapolation, the face estimation module 116 can use two or more of the initial instances and the subsequent instances to identify one or more equations that can be used to extrapolate the position and/or size of the face to additional frames of the video before the initial frames and/or after the subsequent frames. For example, the face estimation module 116 can identify a straight line (e.g., represented by an equation with a degree of one) that represents the position of the face in the additional frames based on the positions of at least two of the detected faces in the initial and/or subsequent frames. Alternatively, the face estimation module 116 can identify a curved line (e.g., represented by a polynomial equation with a degree greater than one) that represents the positions of the face in the additional frames based on the positions of more than two of the detected faces in the initial and/or subsequent frames. Similarly, the face estimation module 116 can identify a straight or curved line that represents the sizes of the face in the additional frames based on the sizes of the face in two or more than two of the detected faces in the initial and/or subsequent frames In some implementations, the face estimation module 116 extrapolates positions of faces in up to a threshold amount of additional frames. For example, the face estimation module 116 can extrapolate up to a fixed number of additional frames before the initial frames and/or after the subsequent frames. In another example, the face estimation module 116 can extrapolate up to a number of additional frames before the initial frames and/or after the subsequent frames that is based on a threshold amount of time, such as a few seconds (e.g., about one, two, or three seconds) of additional frames before the initial frames and/or after the subsequent frames. The interface 110 can, in some implementations, provide a user interface to the computing device 102 with which a user can input the threshold amount of time to be used for additional frames.

In some implementations, the face estimation module 116 or another module detects boundaries between scenes in the frames of video 104. A scene boundary can include, for example, a cut away from one point of view in a scene to another point of view in the same scene, or from one scene to a completely different scene. The face estimation module 116 can cut off or truncate estimation of faces at the scene boundary so that the estimation does not occur across the detected scene boundary. For example, in addition to the threshold number of frames, the face estimation module 116 can end the estimation of faces in the additional frames before the threshold number of frames is encountered if a scene boundary is reached.

In some implementations, the face estimation module 116 can receive a user input (e.g., from the computing device 102 through the interface 110) that manually specifies the position and/or size of one or more faces in the frames of video 104. For example, the faces may be outside the thresholds for detection, clustering, and/or estimation described above. Alternatively, the manually specified faces can be provided to the face detection module 112 and/or the face clustering module 114, for example, to be added to a particular cluster of faces.

The face estimation module 116 provides data describing the instances of the faces from the selection 115, such as the detected faces in the initial and subsequent frames, the estimated faces in the intermediate and/or additional frames, and any manually specified faces in the frames of video 104 to a face blurring module 118. The face blurring module 118 applies a blurring operation to the portions of the frames that include detected, estimated, and/or manually specified faces. The blurring operation obscures the face (or other type of object being detected and estimated), for example, to protect the identity of the person in the frames and/or the person's personal information.

In some implementations, the face blurring module 118 uses a multi-step process to blur the faces. First, the face blurring module 118 can pixelate or reduce the resolution of the portion of each frame that includes a face. For example, the face blurring module 118 can replace a block of pixels, such as a block that is sixteen by sixteen pixels, with a single color that includes an average of the colors for the block or the color from a particular one of the pixels in the block. Next, the face blurring module 118 adds noise to the portions of each frame that include faces. Noise can include, for example, random or pseudo-random variations in brightness and/or color. Then, the face blurring module 118 blurs the portions of each frame that include faces. Blurring can include, for example, applying a box blur and/or Gaussian blur. Finally, the face blurring module 118 can add additional noise to the portions of each frame that include faces.

The face blurring module 118 then stores multiple blurred frames of video 120 in a video data storage 122. One or more computing devices 124a-c, such as mobile computing devices (e.g., laptops or smart phones) or desktop computing devices, may send requests to the video management system 106 for the blurred frames of video 120 using the interface 110 or another interface. The interface 110 provides the requests to a video server 126. The video server 126 then retrieves the blurred frames of video 120 from the video data storage 122. The video server 126 then provides the blurred frames of video 120 to the computing devices 124a-c through the interface 110 over the network 108. In some implementations, the face blurring module 118 and/or the video server 126 provide the blurred frames of video 120, for example, to the computing device 102 in real-time.

In some implementations, an account associated with a person other than the person at the computing device 102 who submitted the frames of video 104 may receive the list of faces 113 and provide the selection 115 to the video management system 106. For example, the video server 126 may provide the blurred frames of video 120 to one of the computing devices 124a-c. A user at the computing device 124c may determine that the blurred frames of video 120 include one or more unblurred instances of the user's face. The user may make an input at the computing device 124c to send a request to the video management system 106 for the list of faces 113. The video management system 106 may process the video as previously described to generate and provide the list of faces 113 and/or retrieve the list of faces 113 from the video data storage 122.

The user at the computing device 124c makes an input for the selection 115, such as by selecting the user's own face from the list of faces 113. In some implementations, the video management system 106 may have previously authenticated the user and verified that one or more images of the user's face actually represent the user. The video management system 106 may store the verified images, for example, in the video data storage 122. In response to receiving the selection 115 from the user's computing device, the video management system 106 compares the face in the selection 115 to the verified images of the user's face or likeness. If the faces match to a threshold degree, then the video management system 106 may then proceed with detecting, clustering, estimating, and/or blurring the user's face in the frames of video 104.

In some implementations, the video management system 106 performs one or more of the operations of detecting, clustering, estimating, and/or blurring on a low quality copy of the video and a high quality copy of the video. The high quality copy of the video can include, for example, the frames of video 104 originally uploaded by the user from the computing device 102. The video management system 106 transcodes the frames of video 104 into low quality video, for example, by decreasing the resolution of each frame and/or the number of frames per second. The video management system 106 can then perform operations, such as detecting, clustering, and/or blurring, on the low quality video in a shorter amount of time that the high quality video and therefore more quickly provide a preview of changes being made to the user at the computing device 102. The video management system 106 can then perform the operations on the high quality video at a later time and/or in the background.

For example, the face detection module 112 and the face clustering module 114 can perform initial face detection and clustering operations on a low quality copy of the video to quickly provide the computing device 102 and/or any of the computing devices 124a-c with the list of faces 113. The face detection module 112 and the face clustering module 114 may then later perform the face detection and clustering operations again on a high quality copy of the video for a more accurate detection and clustering of the faces without delaying the presentation of the list of faces 113 to the user. For example, the later operations may be performed in response to the video management system 106 receiving the selection 115 or after the list of faces 113 has been provided to the computing device 102 and/or any of the computing devices 124a-c.

While shown in FIG. 1 as two separate systems (e.g., the computing device 102 and the video management system 106), alternatively, one or more components of the video management system 106 can be included within the computing device 102. For example, the computing device 102 can include one or more of the interface 110, the face detection module 112, the face clustering module 114, the face estimation module 116, the face blurring module 118, the video data storage 122, and the video server 126. In some implementations, the computing device 102 can include a non-transitory computer readable storage medium that stores instructions which when executed by a processing device at the computing device 102, cause the processing device to perform one or more of the operations previously described with respect to the components of the video management system 106.

Figure 2:
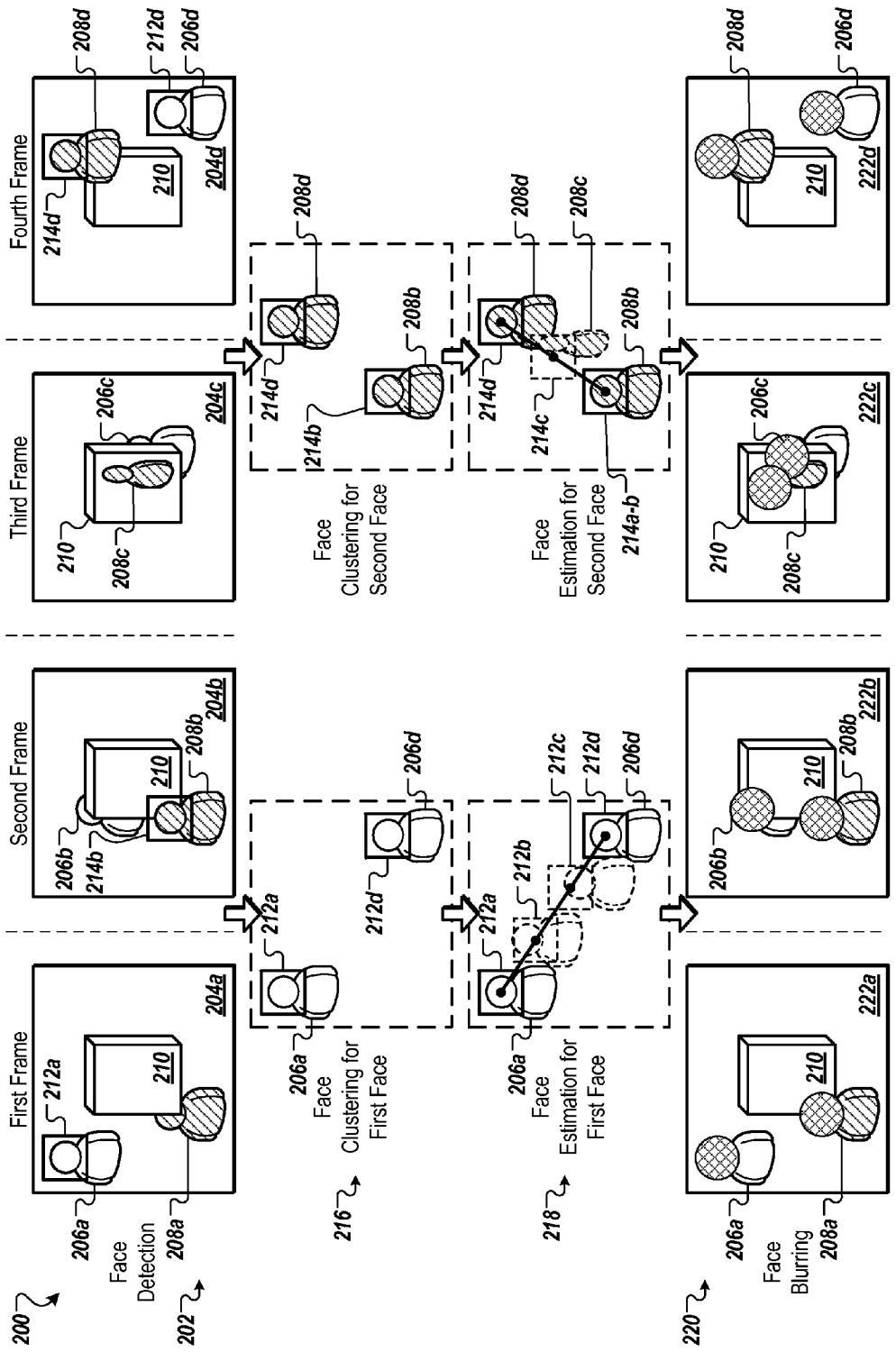
FIG. 2 is a schematic diagram that shows an example of one or more selected objects, such as faces, in an ordered sequence of images, such as video, for a blurring operation.

FIG. 2 is a schematic diagram 200 that shows an example of one or more selected objects, such as faces, in an ordered sequence of images, such as video, for a blurring operation. A first row 202 in the schematic diagram 200 shows multiple frames of video 204a-d representing a face detection operation. The frames of video 204a-d include multiple instances 206a-d of a first person and multiple instances 208a-d of a second person. The frames of video 204a-d also include an object 210 that obstructs a view of the first instance 208a of the second person and the second and third instances 206b-c of the first person. In addition, the third instance 208c of the second person is in a profile orientation that obscures the face of the second person.

Accordingly, the face detection module 112 detects a face 212a in the first frame of video 204a, a face 214b in the second frame of video 204b, no faces in the third frame of video 204c, and multiple faces 212d and 214d in the fourth frame of video 204d. The face detection module 112 then provides the detected faces to the face clustering module 114.

As shown in a second row 216, the face clustering module 114 compares the detected faces and determines that the face 212a in the first frame of video 204a and the face 212d in the fourth frame of video 204d represent the same person (e.g., the first person). The face clustering module 114 also determines that the face 214b in the second frame of video 204b and the face 214d in the fourth frame of video 204d represent the same person (e.g., the second person who is different than the first person). The face clustering module 114 provides the clusters of faces to the face estimation module 116.

As shown in a third row 218, the face estimation module 116 performs linear interpolation for instances of faces that were selected for blurring. The face estimation module 116 performs a linear interpolation between the face 212a from the first frame of video 204a and the face 212d from the fourth frame of video 204d to estimate multiple faces 212b-c for the first person from the second and third frames of video 204b-c, respectively. The face estimation module 116 performs a linear interpolation between the face 214b from the second frame of video 204a and the face 214d from the fourth frame of video 204d to estimate a face 214c for the second person from the third frame of video 204c. The face estimation module 116 can also estimate a position and/or size of a face for the instance 208a of the second person in the first frame of video 204a as the position and/or size of the face 214b from the second frame of video 204b. The face estimation module 116 provides data to the face blurring module 118 that describes the detected and estimated faces.

As shown in a fourth row 220, the face blurring module 118 blurs a portion of each of the frames of video 204a-d corresponding to the instances of the selected faces to generate multiple blurred frames of video 222a-d, respectively. The face blurring module 118 can then store the blurred frames of video 222a-d in the video data storage 122. Also, the video server 126 can provide the blurred frames of video 222a-d to the computing device 102 and/or the computing devices 124a-c.

Figure 3:
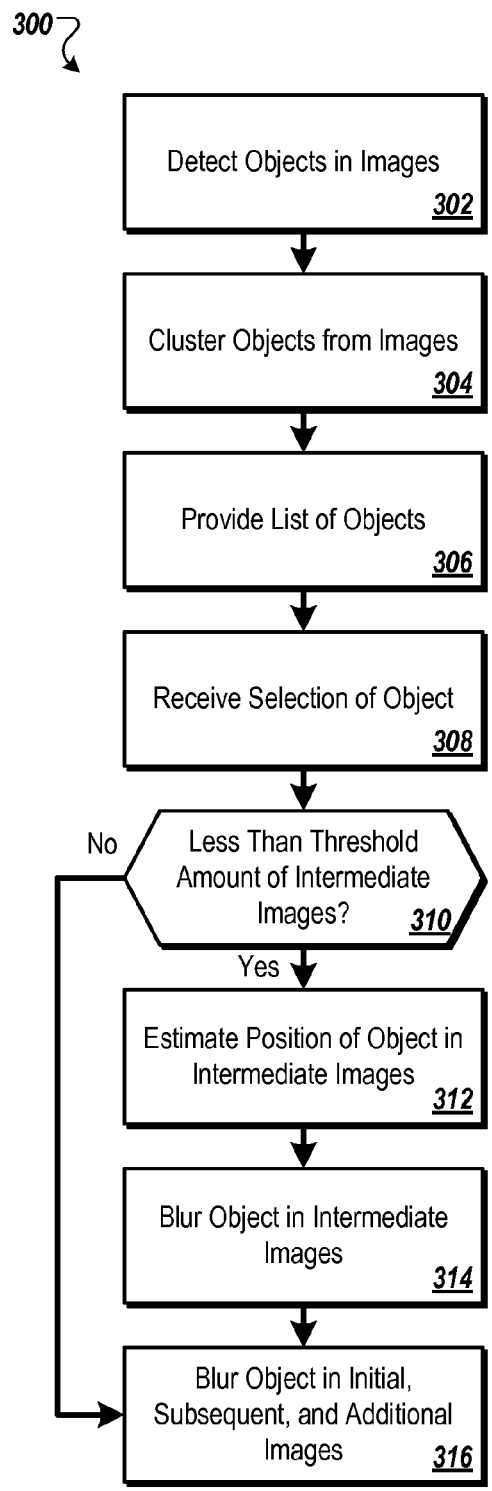
FIG. 3 is flow chart that shows an example of a process for selecting one or more objects in an ordered sequence of images.

FIG. 3 is flow chart that shows an example of a process 300 for selecting one or more objects, such as faces, in an ordered sequence of images, such as video. The process 300 may be performed, for example, by a system such as the system 100. For clarity of presentation, the description that follows uses the system 100 as an example for describing the process 300. However, another system, or combination of systems, may be used to perform the process 300.

The process 300 begins with detecting (302), by a processing device, positions of objects of a specific type within an ordered sequence of images stored in a memory. The positions of the objects include at least one initial position of at least one initial instance of an object of the specific type in at least one initial image within the ordered sequence of images and at least one subsequent position of at least one subsequent instance of the object in at least one subsequent image within the ordered sequence of images. For example, the face detection module 112 can detect the face 212a in the first frame of video 204a and the face 214b in the second frame of video 204b. For example, the face detection module 112 can detect the faces 212d and 214d in the fourth frame of video 204d.

The process 300 can include clustering (304) the initial position and the subsequent position of the first object together. For example, the face clustering module 114 can cluster the faces 212a and 212d from the first and fourth frames of video 204a and 204d together, and the faces 214b and 214d from the second and fourth frames of video 204b and 204d together.

The process 300 can include providing (306), by the processing device, a list of the objects for presentation. For example, the face clustering module 114 can provide the list of faces 113 to the computing device 102 and/or any of the computing devices 124a-c.

The process 300 can include receiving (308), by the processing device, a selection of the object from the list. For example, the face clustering module 114 can receive the selection 115 from the computing device 102 and/or any of the computing devices 124a-c.

If the process 300 determines (310) that the ordered sequence of images includes less than a threshold number of intermediate images between the initial image and the subsequent image, then the process 300 can include estimating (312) one or more intermediate positions of one or more intermediate instances of the selected object in one or more intermediate images within the ordered sequence of images between the initial image and the subsequent image based on the initial position and the subsequent position and blurs (314) the selected object at the intermediate positions in the intermediate images. For example, if the face of the first person is selected, the face estimation module 116 can determine that the frames of video 204b-c between the face 212a of the first person in the first frame of video 204a and the face 212d of the first person in the fourth frame of video 204d include less than a threshold number of frames that corresponds, for example, to two seconds of video. In another example, if the face of the second person is selected, the face estimation module 116 can determine that the frame of video 204c between a face 214a of the second person in the second frame of video 204b and the face 214d of the second person in the fourth frame of video 204d includes less than a threshold number of frames that corresponds, for example, to two seconds of video.

The process 300 can include blurring (314) the object at the initial position in the initial image and the subsequent position in the subsequent image. In some implementations, the process 300 does not perform operations, such as blurring objects, on instances of one or more others of the objects that are not selected. For example, the face blurring module 118 may blur the faces 212a-d of the first person that was selected and not the faces 214a-d of the second person to generate the blurred frames of video 222a-d. In addition, the face blurring module 118 and/or the video server 126 can buffer the video for at least the threshold amount of time (e.g., two seconds) and provide the blurred frames of video 222a-d for presentation at the computing device 102 and/or the computing devices 124a-c. Accordingly, the face blurring module 118 and/or the video server 126 can blur the faces in real-time with a delay due to buffering the video for at least the threshold amount of time.

Figure 4:
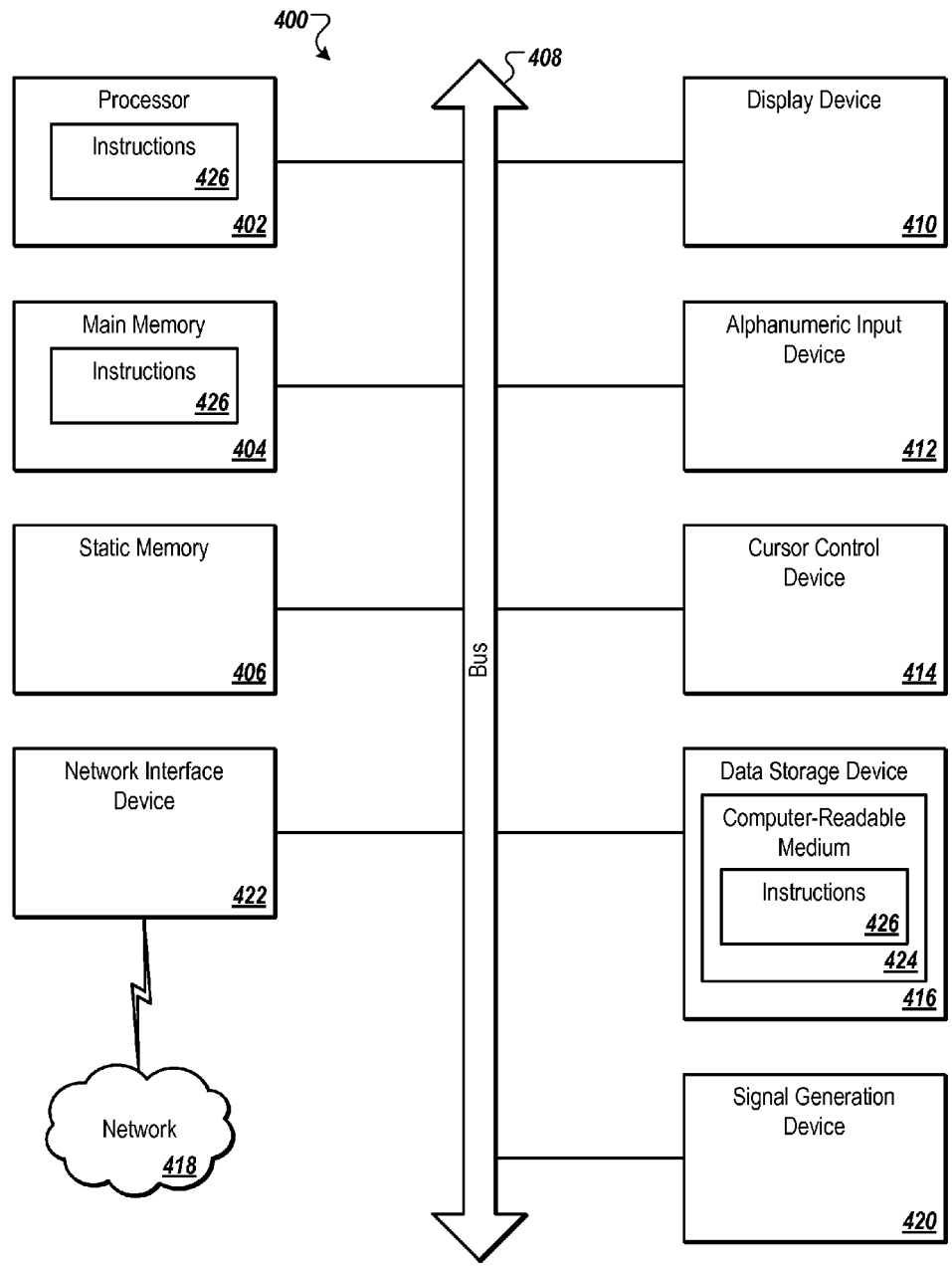
FIG. 4 is a schematic diagram that shows an example of a computing device and a mobile computing device.

FIG. 4 is a schematic diagram that shows an example of a machine in the form of a computer system 400. The computer system 400 can be used to implement one or more of the video management system 106, the computing device 102, and/or the computing devices 124a-c. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 can be configured to execute instructions of the video management system 106, the computing device 102, and/or the computing devices 124a-c for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the video management system 106, the computing device 102, and/or the computing devices 124a-c embodying any one or more of the methodologies or functions described herein. The sets of instructions 426 of the video management system 106, the computing device 102, and/or the computing devices 124a-c may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying," "providing," "enabling," "finding," "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    detecting positions of instances of objects of a specific type within an ordered sequence of images stored in a memory, wherein the ordered sequence of images comprises a video, and wherein the positions of the instances of the objects comprise at least one initial position of at least one initial instance of an object among the objects in at least one initial image within the ordered sequence of images and at least one subsequent position of at least one subsequent instance of the object in at least one subsequent image within the ordered sequence of images after the initial image in the ordered sequence of images;
    determining that the ordered sequence of images comprises a number of intermediate images between the initial image and the subsequent image that is within a first threshold number of images, wherein the first threshold number of images is based on a first threshold amount of time;
    estimating, by one or more processing devices, one or more intermediate positions of one or more intermediate instances of the object in the intermediate images based on the initial position and the subsequent position in response to determining that the number of intermediate images is within the first threshold number of images;
    buffering the video for at least the first threshold amount of time;
    performing an operation on the initial instance, the intermediate instances, and the subsequent instance of the object in real-time with a delay due to buffering the video for at least the first threshold amount of time and without performing the operation on the instances of one or more others of the objects; and
    providing the video for presentation.

2. The method of claim 1, wherein estimating the intermediate positions comprises calculating a linear interpolation of the intermediate positions between the initial position and the subsequent position.

3. The method of claim 1, wherein performing the operation comprises blurring the object at the initial position in the initial image, the intermediate positions in the intermediate images, and the subsequent position in the subsequent image.

4. The method of claim 3, wherein blurring the object comprises lowering a resolution of the object at the initial position in the initial image, the intermediate positions in the intermediate images, and the subsequent position in the subsequent image.

5. The method of claim 1, further comprising determining, based on the initial position and the subsequent position, that the object moves across the intermediate images within a threshold amount and, in response, estimating the intermediate positions.

6. The method of claim 1, further comprising:
    providing a list of the objects for presentation; and
    receiving a selection of the object from the list, wherein performing the operation is in response to receiving the selection.

7. The method of claim 1, wherein detecting, determining, estimating, buffering, performing, and providing are performed by a server computing system, and wherein providing the video comprises providing the video from the server computing system to a client computing system.

8. The method of claim 1, further comprising estimating one or more additional positions of the object in one or more additional images within the ordered sequence of images, wherein the additional images are at one or more of before the initial image or after the subsequent image, and wherein the additional positions of the object in ones of the additional images before the initial image are based at least on the initial position and the additional positions of the object in ones of the additional images after the subsequent image are based at least on the subsequent position.

9. The method of claim 8, wherein the ones of the additional images before the initial image and the ones of the additional images after the subsequent image include up to a second threshold number of images.

10. The method of claim 9, wherein the second threshold number of images is based on a second threshold amount of time.

11. A system comprising:
    a data storage to store an ordered sequence of images; and
    one or more processing devices to:
        detect positions of instances of objects of a specific type within the ordered sequence of images, wherein the ordered sequence of images comprises a video;
        cluster the instances for an object among the objects, wherein the positions of the instances of the object comprise at least one initial position of at least one initial instance of the object in at least one initial image within the ordered sequence of images and at least one subsequent position of at least one subsequent instance of the object in at least one subsequent image within the ordered sequence of images after the initial image in the ordered sequence of images;
        determine that the ordered sequence of images comprises a number of intermediate images between the initial image and the subsequent image that is within a first threshold number of images, wherein the first threshold number of images is based on a first threshold amount of time;
        estimate one or more intermediate positions of one or more intermediate instances of the object in the intermediate images based on the initial position and the subsequent position in response to the determination that the number of intermediate images is within the first threshold number of images;
        buffer the video for at least the first threshold amount of time;
        perform an operation on the initial instance, the intermediate instances, and the subsequent instance of the object in real-time with a delay to buffer the video for at least the first threshold amount of time and without performing the operation on the instances of one or more others of the objects.

12. The system of claim 11, wherein the processing devices are to estimate the intermediate positions by calculating a linear interpolation of the intermediate positions between the initial position and the subsequent position.

13. The system of claim 11, wherein the processing devices are to perform the operation by blurring the object at the initial position in the initial image, the intermediate positions in the intermediate images, and the subsequent position in the subsequent image, and wherein the processing devices are to blur the object by lowering a resolution of the object at the initial position in the initial image, the intermediate positions in the intermediate images, and the subsequent position in the subsequent image.

14. The system of claim 11, wherein the processing devices are further to determine, based on the initial position and the subsequent position, that the object moves across the intermediate images within a threshold amount and, in response, estimate the intermediate positions.

15. The system of claim 11, wherein the processing devices are further to:
  provide a list of the objects for presentation; and
  receive a selection of the object from the list, wherein the processing devices perform the operation in response to receiving the selection.

16. The system of claim 11, wherein the processing devices are further to estimate one or more additional positions of the object in one or more additional images within the ordered sequence of images, wherein the additional images are at one or more of before the initial image or after the subsequent image, and wherein the additional positions of the object in ones of the additional images before the initial image are based at least on the initial position and the additional positions of the object in ones of the additional images after the subsequent image are based at least on the subsequent position.

17. The system of claim 16, wherein the ones of the additional images before the initial image and the ones of the additional images after the subsequent image include up to a second threshold number of images.

18. The system of claim 17, wherein the second threshold number of images is based on a second threshold amount of time.

19. A non-transitory computer-readable storage medium having instructions stored therein that, when executed by one or more processing devices, cause the processing devices to perform operations comprising:
  detecting positions of instances of objects of a specific type within an ordered sequence of images stored in a memory, wherein the ordered sequence of images comprises a video, and wherein the positions of the instances of the objects comprise at least one initial position of at least one initial instance of an object among the objects in at least one initial image within the ordered sequence of images and at least one subsequent position of at least one subsequent instance of the object in at least one subsequent image within the ordered sequence of images after the initial image in the ordered sequence of images;
  determining that the ordered sequence of images comprises a number of intermediate images between the initial image and the subsequent image that is within a first threshold number of images, wherein the first threshold number of images is based on a first threshold amount of time;
  estimating, by the processing devices, one or more intermediate positions of one or more intermediate instances of the object in the intermediate images based on the initial position and the subsequent position in response to determining that the number of intermediate images is within the first threshold number of images;
  buffering the video for at least the first threshold amount of time;
  performing an operation on the initial instance, the intermediate instances, and the subsequent instance of the object in real-time with a delay due to buffering the video for at least the first threshold amount of time and without performing the operation on the instances of one or more others of the objects; and
  providing the video for presentation.

20. The non-transitory computer-readable storage medium of claim 19, wherein performing the operation comprises blurring the object at the initial position in the initial image, the intermediate positions in the intermediate images, and the subsequent position in the subsequent image.

21. The non-transitory computer-readable storage medium of claim 19, wherein the operations further comprise:
  providing a list of the objects for presentation; and
  receiving a selection of the object from the list, wherein performing the operation is in response to receiving the selection.

* * * * *